(12) United States Patent
Östman et al.

(10) Patent No.: US 9,205,797 B2
(45) Date of Patent: Dec. 8, 2015

(54) AIRBAG UNIT FOR A MOTOR VEHICLE SAFETY DEVICE AND A RELATED METHOD OF PACKAGING AN AIRBAG

(71) Applicant: AUTOLIV DEVELOPMENT AB, Vårgårda (SE)

(72) Inventors: Martin Östman, Vårgårda (SE); Mats Berntsson, Göteborg (SE); Karin Ydrén, Vara (SE); Magdalena Wingren, Alingså s (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/517,974

(22) Filed: Oct. 20, 2014

(65) Prior Publication Data
US 2015/0108741 A1   Apr. 23, 2015

(30) Foreign Application Priority Data
Oct. 21, 2013 (EP) ..................................... 13189486

(51) Int. Cl.
*B60R 21/201* (2011.01)
*B60R 21/217* (2011.01)
*B65B 63/04* (2006.01)
*B65B 61/24* (2006.01)

(52) U.S. Cl.
CPC ........... *B60R 21/2176* (2013.01); *B60R 21/201* (2013.01); *B65B 61/24* (2013.01); *B65B 63/04* (2013.01)

(58) Field of Classification Search
CPC .............. B60R 21/2176; B60R 21/237; B60R 2021/21654; B60R 21/201; B65B 61/24; B65B 63/04
See application file for complete search history.

(56) References Cited

U.S. PATENT DOCUMENTS

| | | | | | |
|---|---|---|---|---|---|
| 6,136,415 | A | * | 10/2000 | Spengler | 428/157 |
| 6,145,879 | A | * | 11/2000 | Lowe et al. | 280/743.1 |
| 6,698,790 | B2 | * | 3/2004 | Iseki et al. | 280/733 |
| 2002/0074783 | A1 | * | 6/2002 | Iseki et al. | 280/733 |
| 2003/0159875 | A1 | * | 8/2003 | Sato et al. | 180/274 |

* cited by examiner

*Primary Examiner* — Drew Brown
(74) *Attorney, Agent, or Firm* — Harness, Dickey & Pierce, P.L.C.

(57) ABSTRACT

An airbag unit for a motor vehicle safety device includes an inflatable airbag formed of flexible material and provided in a rolled and/or folded package. The package is held under compression by a cover which extends around at least part of the package. The cover is formed from a ductile fabric material including polymeric fibers, at least some of the fibers fused to one another to impart a predetermined stable shape to the unit. A method of packaging the airbag includes providing an inflatable airbag formed of flexible sheet material; rolling and/or folding the airbag and at least partially wrapping it with an initially flexible cover to form an intermediate package, the cover formed from a ductile fabric material including polymeric fibers; simultaneously heating and pressing the intermediate package to form a compressed package in which at least some of the fibers are fused to one another, the compressed package having a stable shape defined by the fused fibers.

19 Claims, 9 Drawing Sheets

AIRBAG UNIT FOR A MOTOR VEHICLE SAFETY DEVICE AND A RELATED METHOD OF PACKAGING AN AIRBAG

CROSS-REFERENCE TO RELATED APPLICATIONS

This application claims the benefit and priority of European Patent Application No. 13189486.7 filed 21 Oct. 2013. The entire disclosure of the above application is incorporated herein by reference.

FIELD

The present invention relates to an airbag unit for a motor vehicle safety device, and an associated method of packaging an airbag for a motor vehicle safety device.

BACKGROUND

This section provides background information related to the present disclosure which is not necessarily prior art.

The present invention relates to an adaptive gas generator for inflating an airbag generally mounted on a vehicle.

It is now very well known to provide motor vehicles with one or more inflatable airbags to provide protection to the occupants, and also in some arrangements to pedestrians, in the event of an accident involving the motor vehicle. Typically, such airbags are formed from flexible fabric, although some arrangements use other flexible sheet material such as plastics material. Airbags can take various forms such as, for example; so-called driver airbags which typically inflate from within the hub of the motor vehicle's steering wheel to provide protection to the driver of the vehicle in the event of a frontal impact; inflatable curtains arranged to deploy downwardly inside the windows of the motor vehicle to protect occupants in the event of side impacts or rollover accidents; and side airbags arranged to deploy between an occupant of the vehicle and a side panel of the vehicle in order to protect the occupant in the event of a side impact. Of course many other types of airbags are also known, and the present invention is not limited to any particular type of airbag.

Modern motor vehicles are now often designed with very little available space for the mounting of packaged airbags. This can be for a variety of reasons such as aesthetic considerations and for reasons of comfort and convenience to occupants of the vehicle. It is therefore becoming increasingly important to produce very tightly packaged airbags which, in their un-deployed rolled and/or folded configuration, take up very little space within the vehicle, thereby permitting more convenient and imaginative designs of interior trim or seats (for example in the case of side airbags which typically deploy from inside the structure or upholstery of a vehicle seat).

It is also considered convenient to provide such packaged airbags in the form of pre-formed modules or units which can then easily be installed in the motor vehicle during assembly on the production line. Typically, airbag units of this type comprise a hard plastic cover provided around the airbag in order to retain the airbag in its tightly packaged condition and to facilitate convenient and reliable installation of the unit in a motor vehicle. However, such covers add significantly to the cost and weight of the airbag unit, and also add extra bulk to the packaged airbag which makes it difficult to produce airbag units of sufficiently small size for installation in modern vehicles without compromising the interior design aesthetics of the vehicle.

It is therefore an object of the present invention to provide an improved airbag unit for a motor vehicle safety device. It is another object of the present invention to provide an improved method of packaging an airbag for a motor vehicle safety device.

SUMMARY

This section provides a general summary of the disclosure and is not a comprehensive disclosure of its full scope or all of its features.

According to a first aspect of the present invention, there is provided an airbag unit for a motor vehicle safety device, the unit comprising: an inflatable airbag formed of flexible material and provided in a rolled and/or folded package, the package being held under compression by a cover which extends around at least part of the package, wherein said cover is formed from a ductile fabric material comprising a plurality of polymeric fibres, at least some of said fibres being fused to one another to impart a predetermined stable shape to the unit.

Conveniently, said fabric material is a non-woven fabric material.

Optionally, the cover encapsulates the airbag package.

Optionally, said plurality of polymeric fibres includes a plurality of core-sheath bi-component fibres, the sheaths of said bicomponent fibres being fused to one another to impart said predetermined stable shape to the unit.

Advantageously, said bicomponent fibres each have an inner core of polymeric material having a first melting point, and an outer sheath of polymeric material having a second melting point, the second melting point being lower than the first melting point. For example, said second melting point may be in the range of 120-150° C.

Conveniently, said plurality of polymeric fibres also includes a plurality of mono-component fibres.

Advantageously, said mono-component fibres are not fused to one another or to said bi-component fibres.

Conveniently, said mono-component fibres have a melting point which is higher than the melting point of said sheaths of the bi-component fibres.

According to a second aspect of the present invention, there is provided a method of packaging an airbag for a motor vehicle safety device, the method comprising the steps of: providing an inflatable airbag formed of flexible sheet material; rolling and/or folding the airbag and at least partially wrapping it with an initially flexible cover to form an intermediate, said cover being formed from a ductile fabric material comprising a plurality of polymeric fibres; simultaneously heating and pressing the intermediate package to form a compressed package in which at least some of said fibres are fused to one another, said compressed package having a stable shape defined by said fused fibres.

Conveniently said step of simultaneous heating and pressing is effective to give said compressed package a reduced cross-sectional thickness relative to the intermediate package.

Advantageously, the method includes the step of placing the intermediate package in a mould cavity prior to said step of simultaneously heating and pressing the intermediate package, and wherein said step of simultaneously heating and pressing is performed on the intermediate package within said mould cavity.

Conveniently, said step of at least partially wrapping the airbag involves encapsulating the airbag with the cover.

Advantageously, said fabric material is a non-woven fabric material.

Conveniently, said plurality of polymeric fibres includes a plurality of core-sheath bi-component fibres, and said step of simultaneously heating and pressing the intermediate package is effective to fuse the sheaths of said bi-component fibres to one another to impart said predetermined stable shape to the compressed package.

Advantageously, said bicomponent fibres each have an inner core of polymeric material having a first melting point, and an outer sheath of polymeric material having a second melting point, the second melting point being lower than the first melting point, and wherein said step of simultaneously heating and pressing the intermediate package involves heating said fabric material to a temperature above said second melting point but below said first melting point. For example, said second melting point may in the range of 120-150° C.

Conveniently, said plurality of polymeric fibres also includes a plurality of mono-component fibres.

Advantageously, said mono-component fibres have a melting point which is higher than the melting point of said sheaths of the bi-component fibres, and said step of simultaneously heating and pressing the intermediate package involves heating said fabric material to a temperature below said melting point of the mono-component fibres.

According to either of the above-mentioned aspects of the invention, said fabric material may be felt.

In either of the above-mentioned aspects of the invention, said fabric material is optionally formed of polyester. The polyester may be provided in the form of polyethylene terephthalate (PET).

Also, in either of the above-mentioned aspects of the invention each said bi-component fibre may have a core formed of PET homopolymer, and the sheath formed of PET copolymer (coPET). Said mono-component fibres may also be formed of PET.

Advantageously, said bi-component fibres represent 30% to 60% of the total number of fibres in said fabric material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

So that the invention may be more readily understood, and so that further features thereof may be appreciated, embodiments of the invention will now be described by way of example with reference to the accompanying drawings in which.

Figure 7:
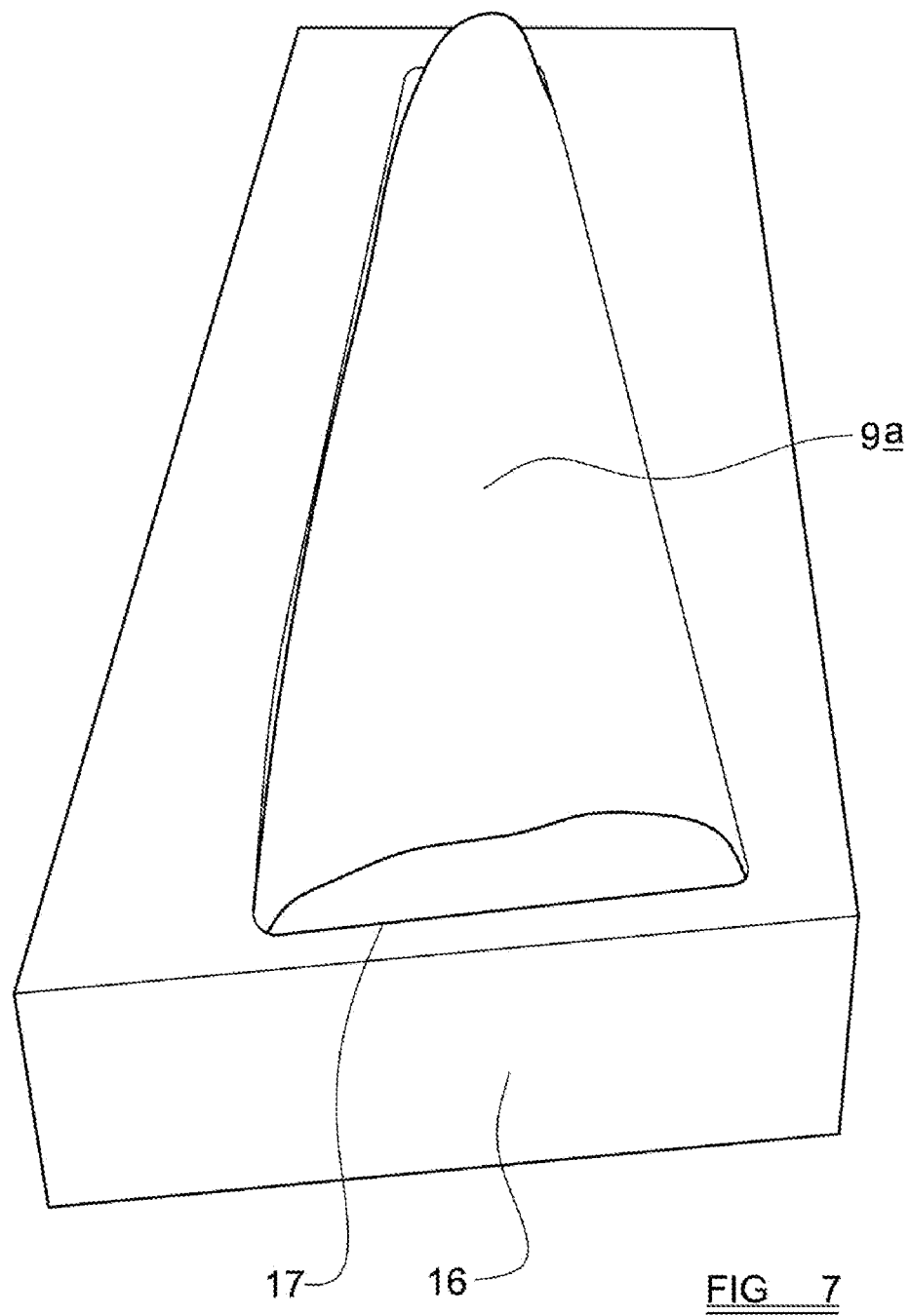
FIG. 7 shows a rolled airbag, wrapped with the cover and formed into an intermediate package received in the mould cavity of the pressing member shown in FIG. 6.
Figure 12:
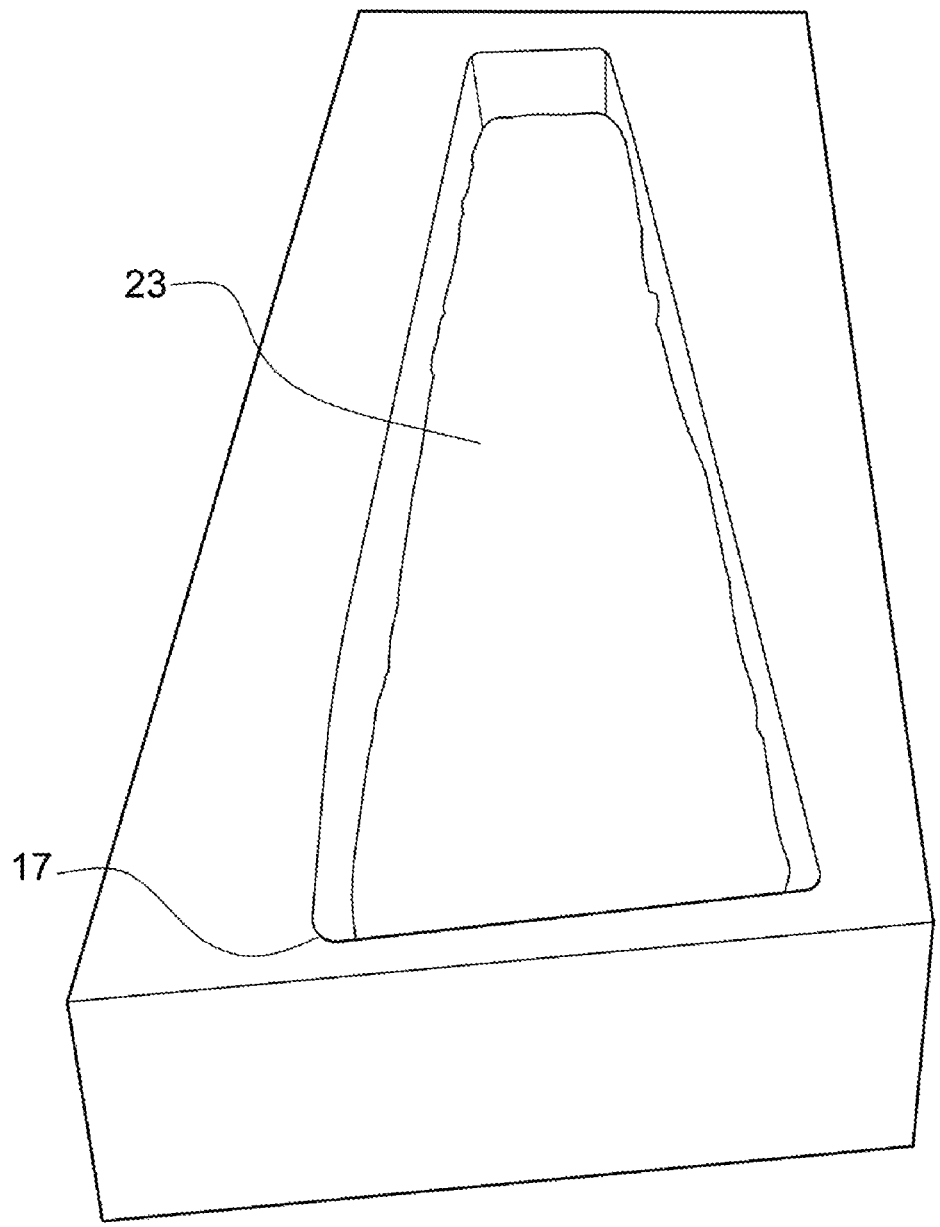

FIG. 12 a view corresponding generally to that of FIG. 7, but which shows the airbag in a subsequent compressed package following simultaneous heating and pressing of the intermediate package.

Figure 13:
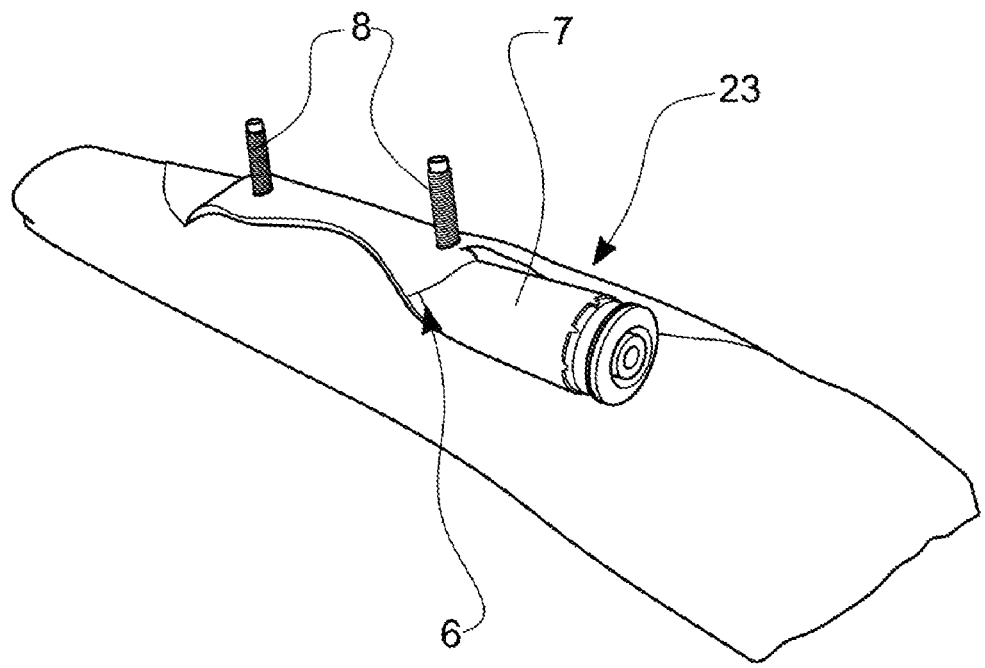

FIG. 13 is a perspective view of a finished airbag unit in accordance with the present invention.

Figure 14:
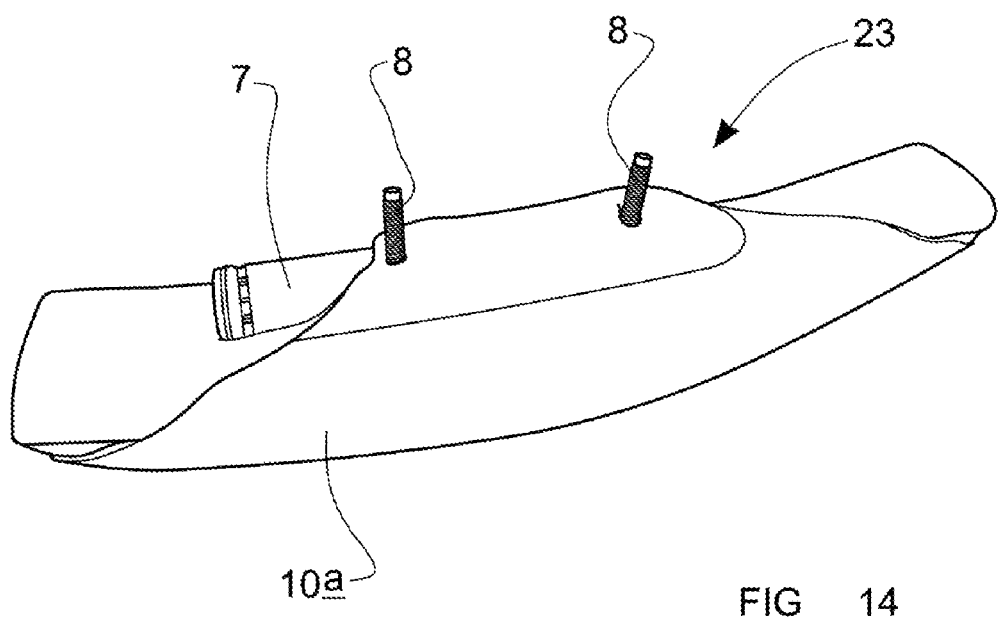

FIG. 14 is another perspective view of the finished airbag unit.

Figure 15:
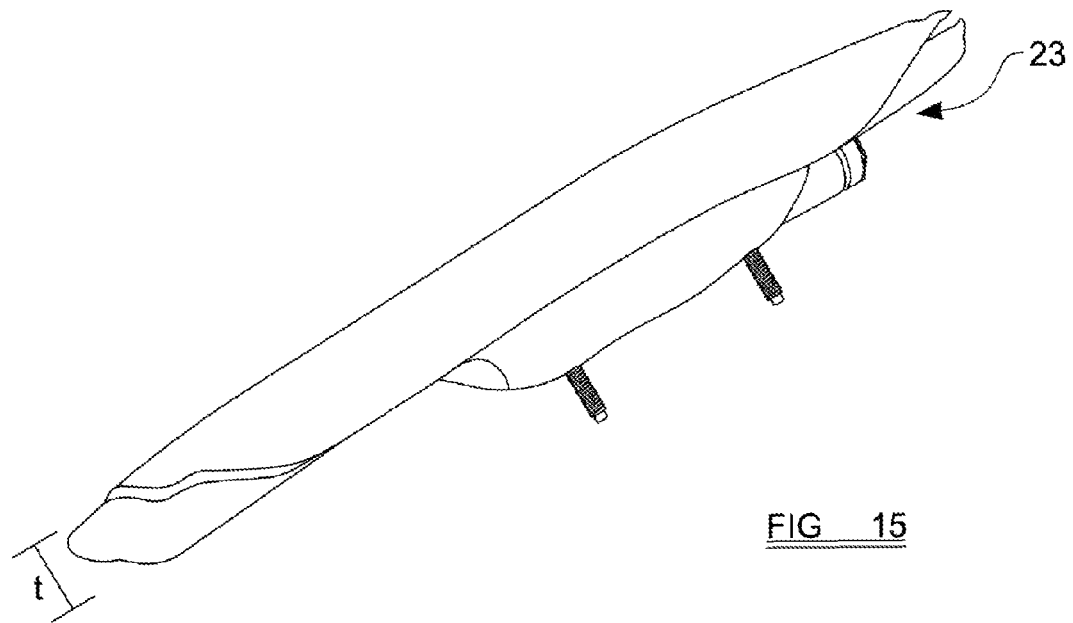

FIG. 15 is yet another perspective view of the finished airbag unit.

Figures 16, 17:
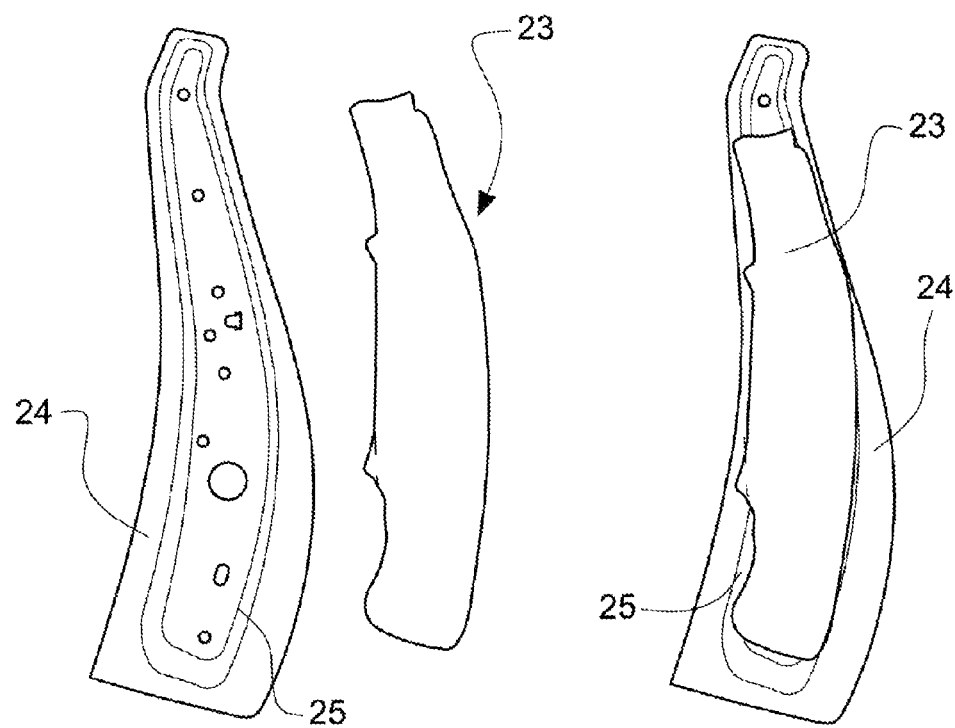

FIG. 16 is a plan view showing the airbag unit alongside part of a vehicle seat frame to which the airbag unit is intended to be mounted.

FIG. 17 is a view similar to that of FIG. 17, but which shows the airbag unit mounted to the seat frame.

Corresponding reference numerals indicate corresponding parts throughout the several views of the drawings.

DETAILED DESCRIPTION

Example embodiments will now be described more fully with reference to the accompanying drawings.

Figure 1:
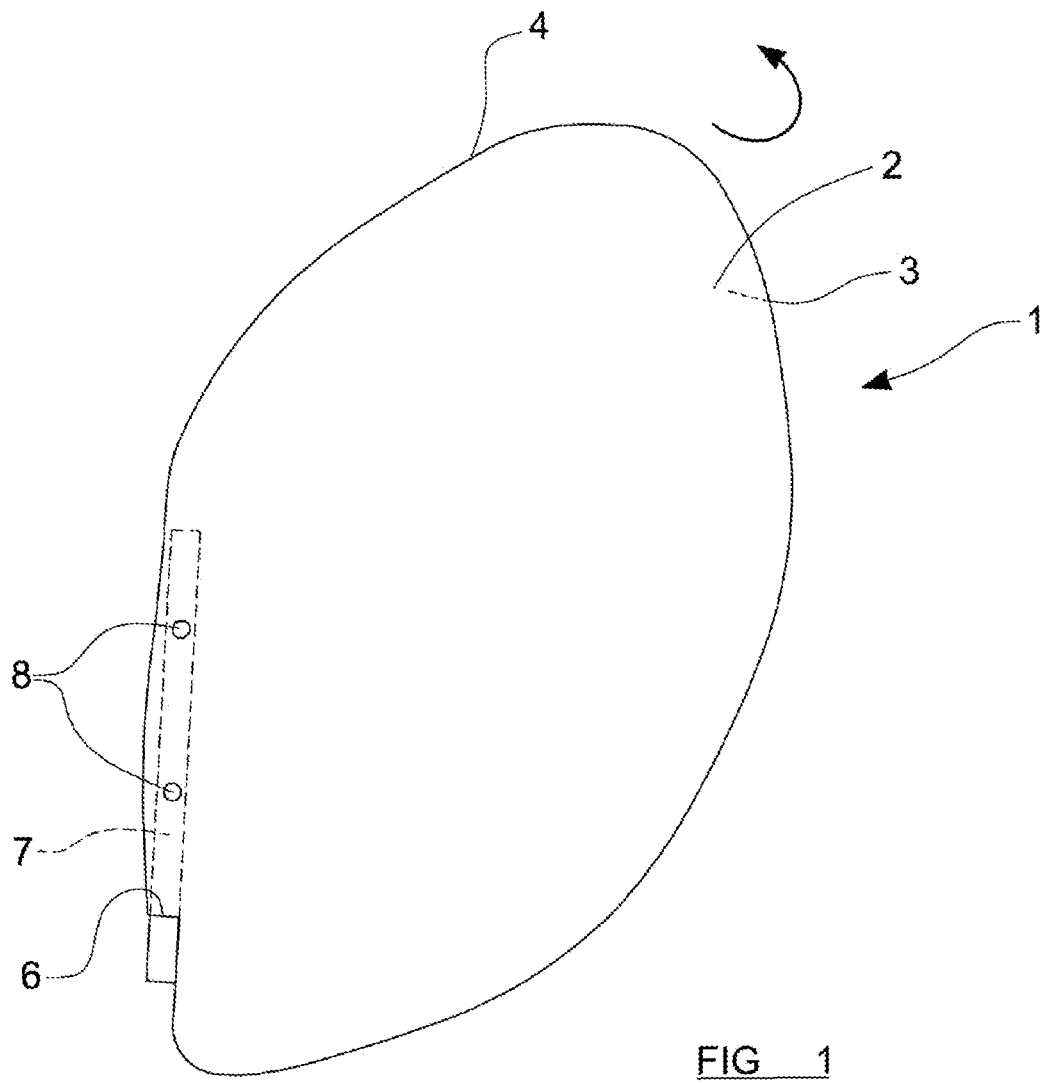
FIG. 1 is a schematic plan view of an unfolded exemplary airbag suitable for packaging via the method of the present invention.

Referring initially to FIG. 1, there is shown an airbag 1 suitable for use in the method of the present invention. The particular airbag illustrated is a so-called side airbag of a type intended to be installed in the side of a vehicle seat for deployment between the seat occupant and a side door or panel of the motor vehicle. However, it is to be appreciated that the present invention is not restricted to side airbags of the type illustrated, and indeed could be used to package airbags of any type. Indeed, it has been found that airbag units and the method of the present invention offer significant advantages to airbags of the inflatable curtain type, as will be explained in more detail below. Furthermore, it should also be appreciated that the airbag 1 illustrated is shown in a basic form to illustrate clearly the general concept of the invention. Other more complex airbag configurations may also be packaged via the method of the present invention.

The airbag 1 may be formed from two substantially identical sheets of flexible material 2, 3, such as woven fabric, which are superimposed on one another and interconnected around their aligned edges by a peripheral seam 4 to define a large internal inflatable volume between the sheets for the receipt of inflating gas from an inflator such as a gas generator.

As will be appreciated by those of skill in the art of airbag manufacture, although the airbag 1 has been described above as being formed from two separate sheets 2, 3 of flexible material, it is envisaged that in variants of the invention the airbag could be formed from a single sheet of flexible material, the sheet being folded in half to create two superimposed layers which can then be interconnected by a peripheral seam in an otherwise similar manner to that described above with reference to FIG. 1. It is also envisaged that in some embodiments the two sheets 2, 3 could be woven simultaneously via a so-called "one-piece weaving" technique, known per se, in which the warp and weft yarns forming the two layers are interwoven in selected areas to form an interconnecting peripheral seam which is integral to the woven structure of the two sheets.

The fabric from which the airbag 1 is constructed is preferably a plastic fabric, for example a fabric formed by weaving together warp and weft yarns of polyamide fibres. The fabric may be provided with a coating of thermoplastic material.

The airbag is formed so as to have an opening 6 for insertion of the inflator 7 into the inflatable volume of the airbag. FIG. 1 shows a cylindrical inflator 7 in its installed position in which the inflator extends through the opening 6 such that its major extent lies within the inflatable volume of the airbag. A short length of the inflator projects outwardly from the airbag through the opening 6 to facilitate electrical connection of a control cable. As is conventional, the inflator has a pair of outwardly extending mounting spigots 8 which project outwardly through respective apertures formed in the fabric of one of the sheets 2, and which are configured to be mounted to the structure of a vehicle seat, thereby anchoring the airbag in position against the seat.

Figure 2:
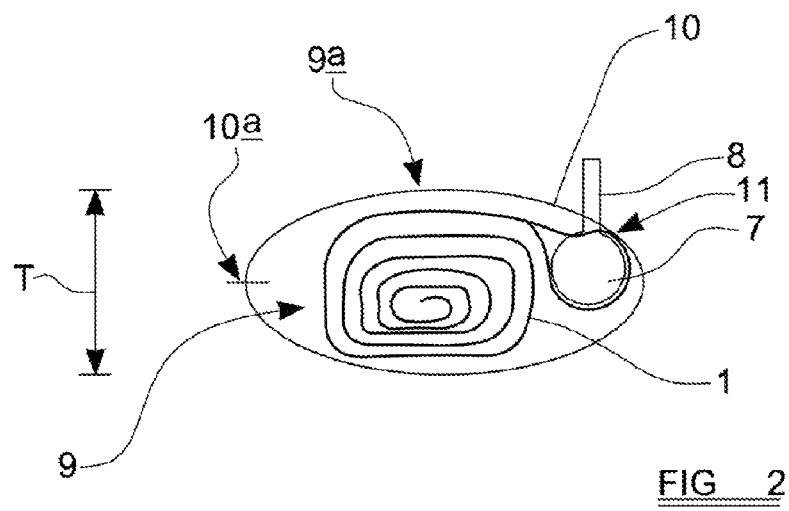
FIG. 2 is a schematic cross-sectional illustration showing the airbag of FIG. 1 in a rolled configuration and wrapped with a cover to form an intermediate package.

In order to package the airbag ready for installation in the vehicle, the airbag is initially rolled and/or folded into a small package 9 as illustrated schematically in FIG. 2. The particular package 9 illustrated in FIG. 2 is created by rolling the airbag 1 towards the inflator 7 to create a rolled package comprising a monotonous roll. It is to be noted, however, that the package 9 could alternatively be formed by folding the airbag 1, or by creating two or more rolls in the airbag, or even via a combination of rolling and folding the airbag, each of which techniques are known per se. In the case of a rolling technique, the airbag 1 may be rolled around a mandrel (not shown) which may then be withdrawn from the resulting package along its axis.

The rolled and/or folded airbag 1 of the package 9 is wrapped in a flexible cover 10 to create an intermediate package 9a. The cover 10 may be configured to form a simple band around the airbag, such that end regions of the airbag package 9 protrude from the sides of the band. However, it is envisaged that in most embodiments the cover 10 will substantially completely encapsulate the airbag package 9. In such arrangements the cover 10 can be simply folded around and over the airbag package, such that respective edge regions of the cover material lie loosely against one another, for example as shown at 11 in FIG. 2. However, for convenience in preventing the package 9 and cover 10 from unravelling, the folds or regions of the cover material can be held in position by a simple tack stitch or the like, noting that any such tack stitch will contribute significantly to the integrity of the finished airbag unit. The complete intermediate package 9a, comprising the airbag 1 and the flexible cover 10 has an initial cross-sectional thickness T.

The cover 10 may be provided with a predefined tear-seam 10a, such as a line of perforations. As will be appreciated by those of skill in the art of airbag manufacture, the tear seam 10a is configured to rupture upon inflation of the airbag 1 in order to permit the airbag to burst through the cover 10 in the event of airbag deployment in a crash situation.

Figure 3:
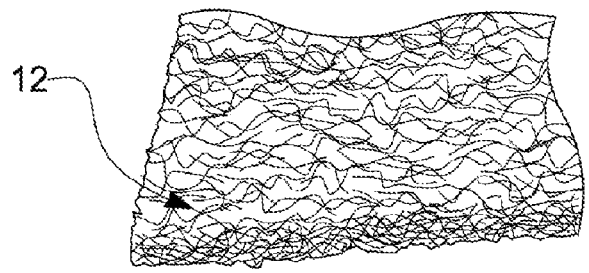
FIG. 3 is a perspective view of the material from which the cover shown in FIG. 2 is made, the material being shown in its natural condition prior to processing by subsequent steps of the method.

The material of the cover 10 takes the form of a non-woven fabric material 12 comprising a plurality of polymeric fibres. The non-woven fabric 12 is provided in form of a felt. FIG. 3 shows a region of the non-woven fabric 12 in its natural condition under atmospheric conditions and prior to subsequent processing steps in accordance with the method of the present invention. In this configuration the material may have a thickness of approximately 4.25 mm and a density of 300 g/m$^2$. An exemplary material considered particularly suitable for the present invention is a polyester felt produced by a known needle technique in which a needling process is used to entangle and lock together the constituent polyester fibres of the material. The polyester fibres may be provided in the form of polyethylene terephthalate (PET) such that the felt material 12 is formed of 100% PET.

Figure 4:
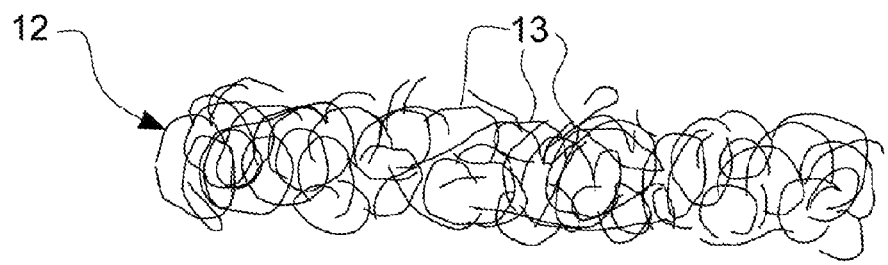
FIG. 4 is a schematic illustration showing the arrangement of fibres in the material shown in FIG. 3.

FIG. 4 is a schematic illustration showing the manner in which the constituent fibres 13 of the felt material 12 are entangled with one another in a random or quasi-random manner. However, it is to be noted that the felt 12 used in embodiments of the present invention actually includes fibres 13 of two distinct configurations.

Figure 5:
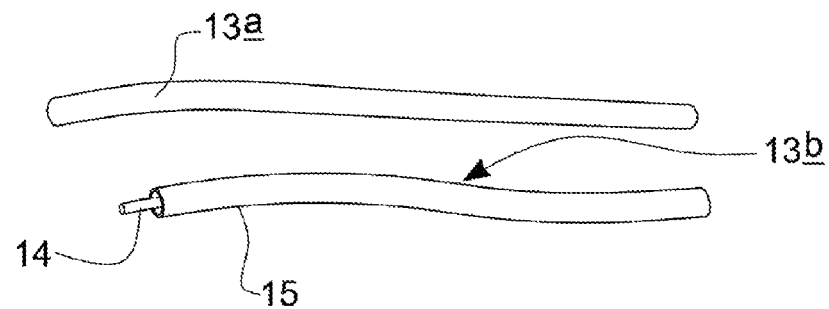
FIG. 5 is a schematic illustration showing two different types of fibres which make up the material shown in FIGS. 3 and 4.

FIG. 5 shows the two configurations of fibre used to make up the felt material 12 in more detail. The upper fibre 13a illustrated in FIG. 5 is a mono-component fibre formed entirely from PET. In particular, it is envisaged that the mono-component fibres 13a will be formed entirely from PET homopolymer. In contrast, the lower fibre 13b illustrated in FIG. 5 is a bi-component fibre having a discrete core 14 and surrounding sheath 15. The core 14 and sheath 15 of the bi-component fibre 13b are configured to have different properties, and in particular different melting points, with the sheath 15 having a significantly lower melting point (for example in the range of 120-150° C.) than the core 14. Whilst the bi-component fibres 13b may also be formed entirely from PET, it is proposed that the core 14 will be formed from PET homopolymer, whilst the sheath 15 will be formed from PET copolymer (coPET). This combination of PET and coPET provides the sheath 15 with a lower melting point than the core 14, whilst ensuring that the entire fibre 13b is formed of PET. Of course it will be noted that because the core 14 of the bi-component fibres 13b, and the mono-component fibres 13a are both formed of PET homopolymer, they will have the same melting point as each other, the mono-component fibres 13a thus having a higher melting point than the sheaths 15 of the bi-component fibres 13b The bi-component fibres 13b are evenly distributed throughout the mono-fibres 13a within the felt material 12. It is proposed that the bi-component fibres 13b will represent between 30% and 60% of the total number of fibres 13 within the felt material 12, with the balance being made up solely of the mono-component fibres 13a.

Figure 6:
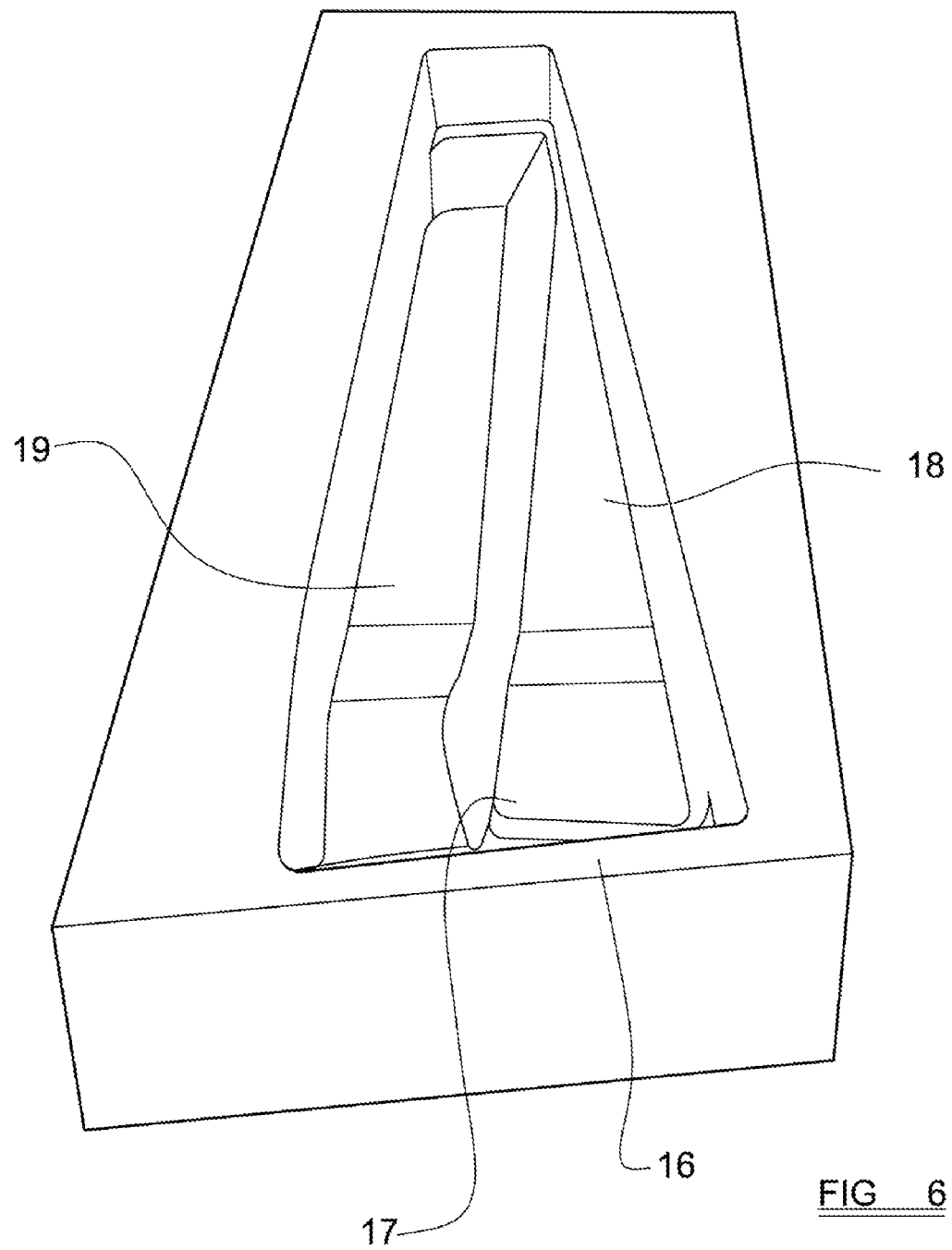
FIG. 6 is a perspective view of a pressing member having a mould cavity which can be used in the method of the present invention.

FIG. 6 illustrates a solid press member 16 which may be formed, for example, from cast metal. The press member 16 has a recess defining a mould cavity 17 of three-dimensional form. In the particular press member 16 illustrated in FIG. 6, it will be noted that the mould cavity 17 is stepped so as to define a first relatively shallow part 18, and a second relatively deep part 19.

Figure 8:
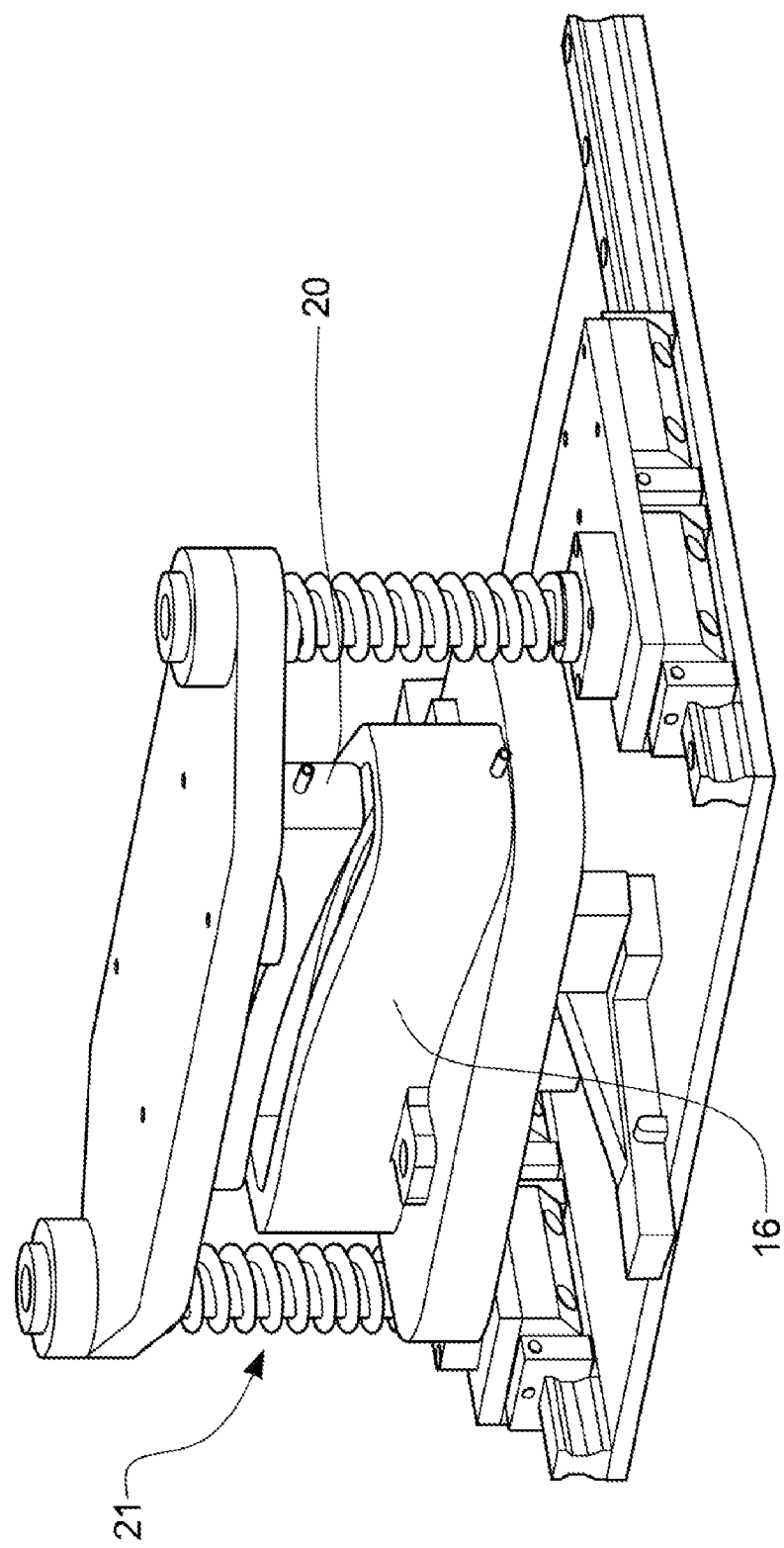
FIG. 8 shows a press used to compress the intermediate package within the mould cavity shown in FIG. 6.

As illustrated in FIG. 7, the intermediate package 9a formed by wrapping the rolled and/or folded airbag package 9 in the felt cover 10 is placed inside the mould cavity 17 in the press member 16. As illustrated in FIG. 8, the press member 16 is then positioned below another press member 20 in a press apparatus 21 which may be, for example, an industrial hydraulic press apparatus. The upper press member 20 is sized and configured to fit slidingly within the lower press member 20 holding the intermediate package 9a, such that actuation of the press apparatus is effective to drive the upper press member 20 into the mould cavity 17 of the lower press member 16, to thereby compress the intermediate package 9a. The upper press member 20 may be configured such that its undersurface has a three-dimensional profile conforming to a desired shape for the finished airbag unit.

The press apparatus 21 is actuated whilst the intermediate package 9a is heated, for example by being placed within an oven, to a temperature in excess of the melting point of the sheaths 15 of the bi-component fibres 13b, but which is below the melting point of the cores 14 of the bi-component fibres 13b, and also the mono-component fibres 13a. As will be appreciated, the intermediate package 9a is thus simultaneously heated and pressed in the method of the present invention, although it is to be noted in this regard that it is not essential for the heat and pressure to be applied to the package at precisely the same instant in time. For example, it is envisaged that the heat may be applied before the application of pressure to the intermediate package; the important aspect being that there is at least a period of time during which both heat and pressure are applied to the intermediate package The press may be operated to apply a pressing force of between 5 and 200 kN to the intermediate package 9a, whilst the temperature is held above the melting point of the sheaths 15 of the bi-component fibres 13b. The time period during which the intermediate package 9a is simultaneously heated and pressed will depend on the nature of the cover material, but it is envisaged that it will be less than 2 minutes, and of course as short as possible to allow efficient manufacture of the airbag unit.

As will be appreciated, the compression applied to the intermediate package 9a by the press 21 is effective to conform the intermediate package 9a, on account of the flexible nature of the airbag 1 and the initially flexible nature of the cover 10, to the profile of the mould cavity 17 and the undersurface of the upper press member 20. The intermediate package 9a is urged into a three-dimensional shape defined by the shape of the mould cavity 17 and the profile of the undersurface of the upper press member 20.

In the case that the airbag 1 is formed of plastic fabric, the simultaneous application of pressure and heat to the intermediate package 9a causes the fabric of the airbag to plastically deform as it is compressed. The rolled airbag 1 within the intermediate package 9a is thus flattened, with clearly defined creases being formed which will persist after the airbag is subsequently cooled.

Figure 9:
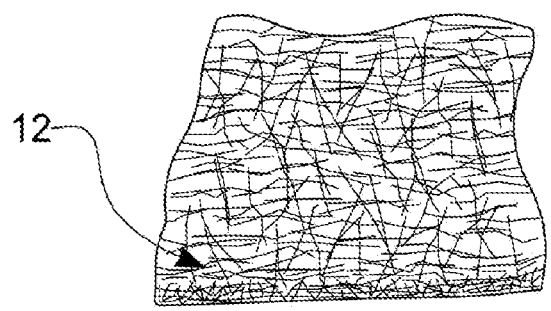
FIG. 9 shows the material of the cover in a condition arising after simultaneous heating and pressing of the intermediate package in the press of FIG. 8.
Figure 10:
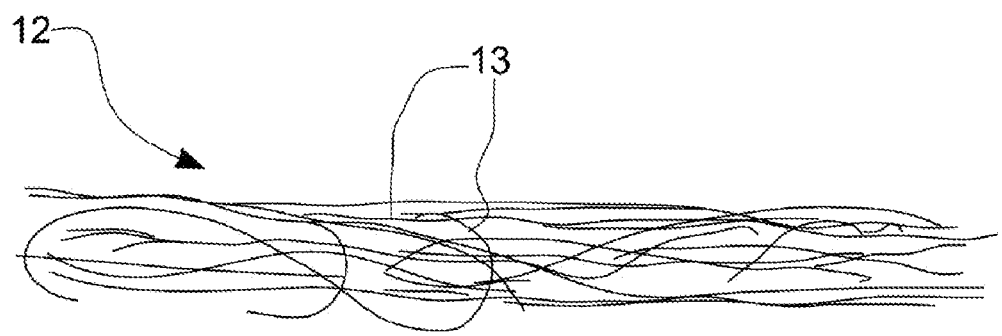
FIG. 10 is a schematic illustration showing the arrangement of fibres in the heated and pressed material shown in FIG. 9.
Figure 11:
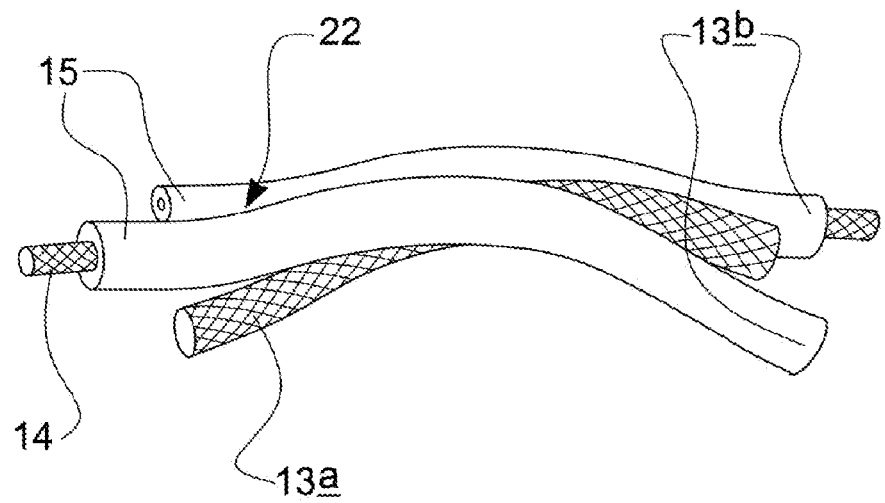
FIG. 11 is a schematic illustration showing some of the fibres of the material fused to one another.

However, even in the case that the airbag 1 is not formed of plastically deformable material, the simultaneous application of heat and pressure to the intermediate package 9a will in any event cause the felt material of the cover 10 to plastically deform as it is compressed, with its fibres being compressed together such that the felt material becomes thinner (for example 0.55 mm) and adopts the compressed configuration illustrated in FIGS. 9 and 10. More particularly, the application of heat at a temperature above the melting point of the sheaths 15 of the bi-component fibres will cause the sheaths 15 to melt. At positions throughout the distribution of fibres within the cover material, the sheaths 15 will thus fuse together, as indicated schematically at 22 in FIG. 11. However, because the cover material is heated to a temperature below the melting point of the cores 14 of the bi-component fibres 13b and the entire structure of the mono-component fibres 13a, the cores 14 and the mono-component fibres 13a will remain in the solid phase and thus will not fuse together. The result is that only the material of the sheaths 15 fuses.

FIG. 12 shows the compressed package 23 which is formed from the intermediate package 9a via the above-described heating and pressing technique, within the mould cavity 17 following subsequent opening of the press 21, the compressed package 23 defining an airbag unit made via the method of the present invention. The above-described fusion of only the sheaths 15 of the bi-component fibres distributed throughout the material of the cover 10, is effective and sufficient to retain the pressed three-dimensional shape imparted to the intermediate package 9a by the press 20 when the package is subsequently removed from the press 20 after the step of simultaneous heating and pressing is complete. The cover 10 is thus effective to retain the rolled airbag 1 inside it in compression arising from the pressing step.

FIGS. 13 to 15 show various different views of a finished airbag unit 23 made via the above-described method. The airbag unit 23 is shown in the condition in which it is removed from the mould cavity 17 after the simultaneous heating and pressing step. No further finishing is required. As will be noted, the airbag unit 23 has a cross-sectional thickness t which is reduced relative to the initial cross-sectional thickness T of the intermediate package.

The fused-together sheaths 15 of the bi-component fibres 13b are effective to maintain the shape of the airbag unit 23 when it is removed from the mould cavity, the shape of the airbag 24 thus being stable. However, because the cores 14 of the bicomponent fibres 13b and the entire mono-component fibres 13a are not fused, then the cover 10 of the airbag unit 23 still retains a soft and slightly pliable nature. As will be noted, the airbag 1 is very tightly packed inside the cover 10, and the compressed cover 10 itself is thin.

FIG. 16 shows the exemplary airbag unit 23 alongside a backrest side-frame 24 of a vehicle seat structure. The side frame 24 has a curved recess 25 provided in its outwardly directed surface. The airbag unit 24 made via the above-described method can be shaped and sized so as to fit neatly inside the recess 25 in the side-frame 24, as shown in FIG. 17.

As will be appreciated, the above-described method of producing an airbag unit 24 allows airbags to be very tightly packaged, in a soft but three-dimensionally shaped cover 10 which has a stable shape, in practically any configuration. The method thus permits the manufacture of compact airbag units which can be mounted in previously difficult areas of a motor vehicle.

Whilst the present invention has been described above with particular reference to a side airbag, it is to be appreciated that it can be embodied in airbags of other types and configurations. For example, it has been found that packaging side-curtain airbags in covers 10 of the type disclosed herein offers significant advantages over previously proposed soft airbag covers. Side curtain airbags are typically very long and are tightly rolled and so also narrow. They can be subject to twist when they are installed in the roof lining of a motor vehicle which can adversely affect the inflation characteristic of the airbag. It has been found that by wrapping at least parts of the side-curtain airbag in a cover 10 of the type proposed above, the resulting airbag unit is significantly less susceptible to twist upon installation in a motor vehicle.

Furthermore, whilst the invention has been described above with specific reference to an embodiment using non-woven fabric material 12 of a felt-type, variants of the invention are also envisaged that will not use non-woven material. In this regard, it is noted that it is the ductile behaviour of the above-described non-woven felt material 12 that makes it particularly suitable for use in this invention. It is therefore envisaged that other ductile fabric types may also be used in the invention, and which may, for example, be woven. In this regard, the term ductile fabric is used herein to denote a fabric which has a material composition or a construction of its constituent fibres which gives the fibres of the fabric a moveable or elastic behaviour. Such behaviour enables the fabric to conform closely to the form of the mould cavity 17 during the heating and pressing step of the method.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. An airbag unit for a motor vehicle safety device, the unit comprising:
    an inflatable airbag formed of flexible material and provided in a rolled and/or folded package; and
    a cover extending around at least part of the package and holding the package under compression, the cover formed from ductile fabric material including a plurality of polymeric fibres, at least some of the fibres being fused to one another to impart a predetermined stable shape to the unit.

2. The airbag unit according to claim 1, wherein the plurality of polymeric fibres includes a plurality of core-sheath bi-component fibres, the sheaths of said bicomponent fibres being fused to one another to impart said predetermined stable shape to the unit.

3. The airbag unit according to claim 2, wherein the bicomponent fibres each have an inner core of polymeric material having a first melting point, and an outer sheath of polymeric material having a second melting point, the second melting point being lower than the first melting point.

4. The airbag unit according to claim 2, wherein said plurality of polymeric fibres also includes a plurality of mono-component fibres.

5. The airbag unit according to claim 4, wherein the bicomponent fibres each have an inner core of polymeric material having a first melting point, and an outer sheath of polymeric material having a second melting point, the second melting point being lower than the first melting point; and
    wherein the mono-component fibres have a melting point which is higher than the melting point of said sheaths of the bi-component fibres.

6. The airbag unit according to claim 2, wherein each bi-component fibre has a core formed of PET homopolymer, and the sheath formed of PET copolymer.

7. The airbag unit according to claim 4, wherein the mono-component fibres are formed of PET.

8. The airbag unit according to claim 1, wherein the cover has a stable, three-dimensional shape.

9. The airbag unit according to claim 1, wherein the plurality of polymeric fibres are entangled with one another in a random manner.

10. The airbag unit according to claim 1, wherein the fabric material is felt.

11. A method of packaging an airbag for a motor vehicle safety device, the method comprising:
    providing an inflatable airbag formed of flexible sheet material;
    rolling and/or folding the airbag and at least partially wrapping it with an initially flexible cover to form an intermediate package, the cover being formed from a ductile fabric material including a plurality of polymeric fibres; and
    simultaneously heating and pressing the intermediate package to form a compressed package in which at least some of the fibres are fused to one another, the compressed package having a stable shape defined by the fused fibres.

12. The method according to claim 11, further comprising placing the intermediate package in a mould cavity prior to simultaneously heating and pressing the intermediate package, and wherein said simultaneously heating and pressing is performed on the intermediate package within the mould cavity.

13. A method according to claim 11, wherein the plurality of polymeric fibres includes a plurality of core-sheath bi-component fibres, and simultaneously heating and pressing the intermediate package is effective to fuse the sheaths of the bi-component fibres to one another to impart the predetermined stable shape to the compressed package.

14. The method according to claim 13, wherein said bicomponent fibres each have an inner core of polymeric material having a first melting point, and an outer sheath of polymeric material having a second melting point, the second melting point being lower than the first melting point, and wherein simultaneously heating and pressing the intermediate package involves heating the fabric material to a temperature above said second melting point but below the first melting point.

15. A method according to claim 14, wherein the plurality of polymeric fibres also includes a plurality of mono-component fibres having a melting point which is higher than the melting point of the sheaths of the bi-component fibres, and simultaneously heating and pressing the intermediate package involves heating the fabric material to a temperature below the melting point of the mono-component fibres.

16. The method according to claim 13, wherein each bi-component fibre has a core formed of PET homopolymer, and a sheath formed of PET copolymer.

17. The method according to claim 15, wherein the mono-component fibres are formed of PET.

18. An airbag unit for a motor vehicle safety device, the unit comprising:
    an inflatable airbag; and
    a cover extending around at least part of the inflatable airbag and holding the inflatable airbag under compression, the cover formed from fabric material including a plurality of fibres entangled with one another in a random manner, at least some of the fibres being fused to one another to impart a predetermined stable shape to the unit,
    wherein the cover has a stable, three dimensional shape.

19. The airbag unit according to claim 18, wherein the fabric material is felt.

* * * * *